May 16, 1967   K. R. JOHNSON ETAL   3,319,539
MACHINE FOR MAKING DOUBLE-WALL PACKAGES
Filed Jan. 25, 1965   3 Sheets-Sheet 2
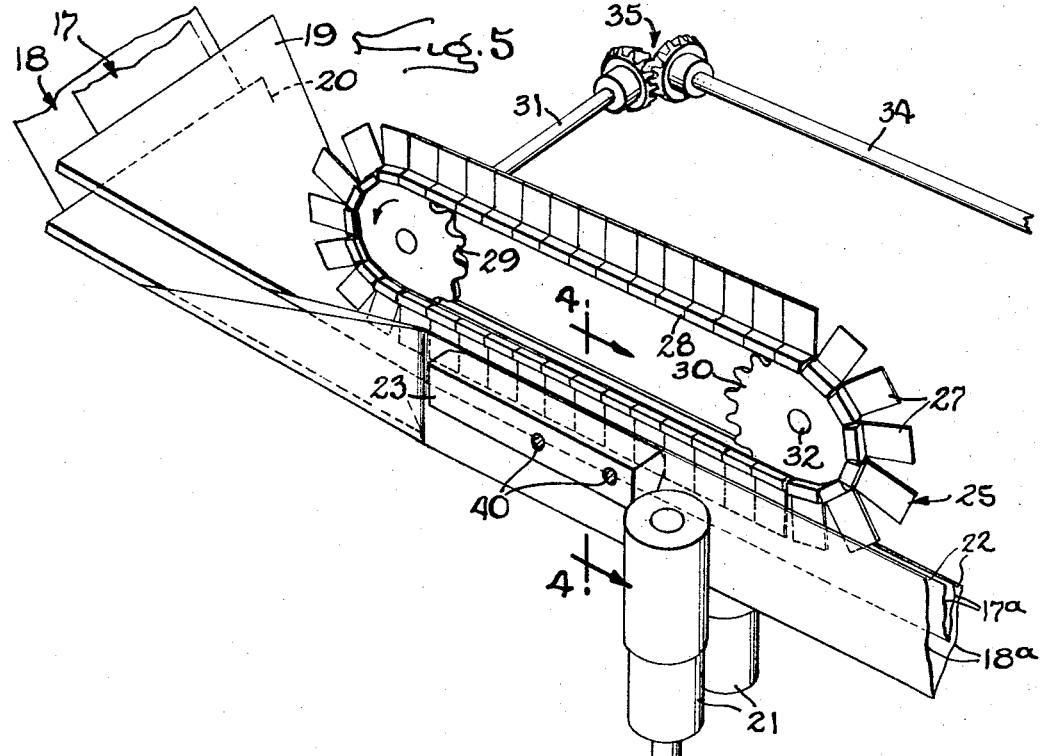
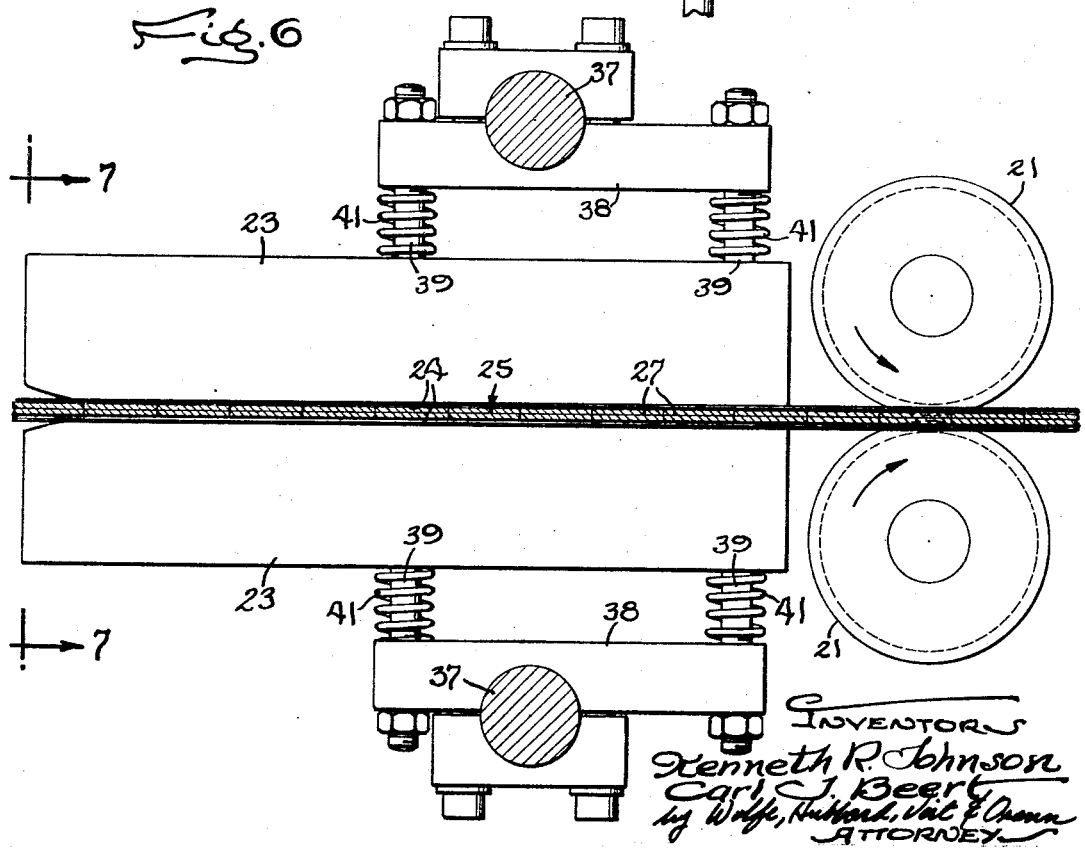
INVENTORS
Kenneth R. Johnson
Carl J. Beer
by Wolfe, Hubbard, Voit & Osann
ATTORNEY

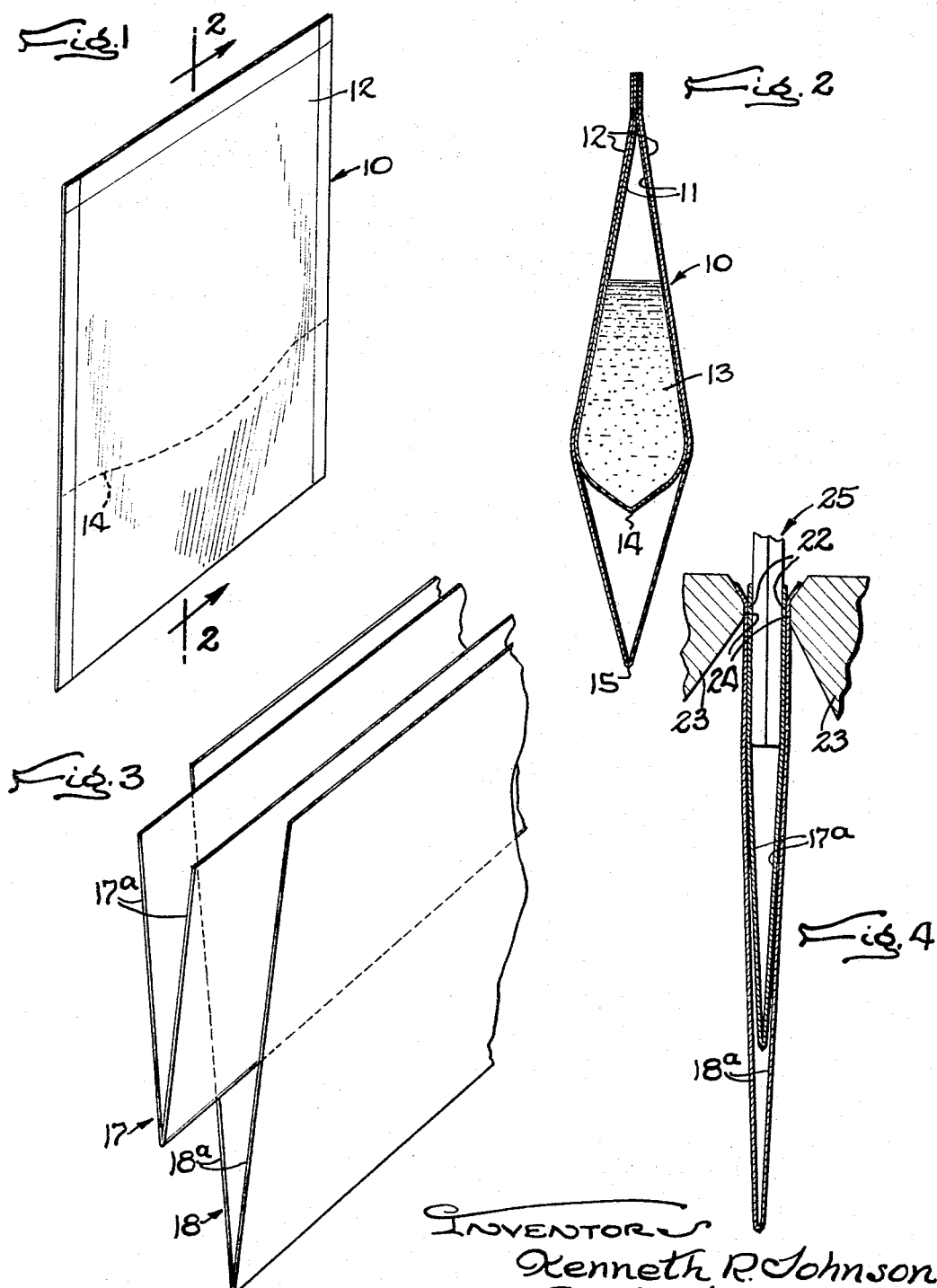

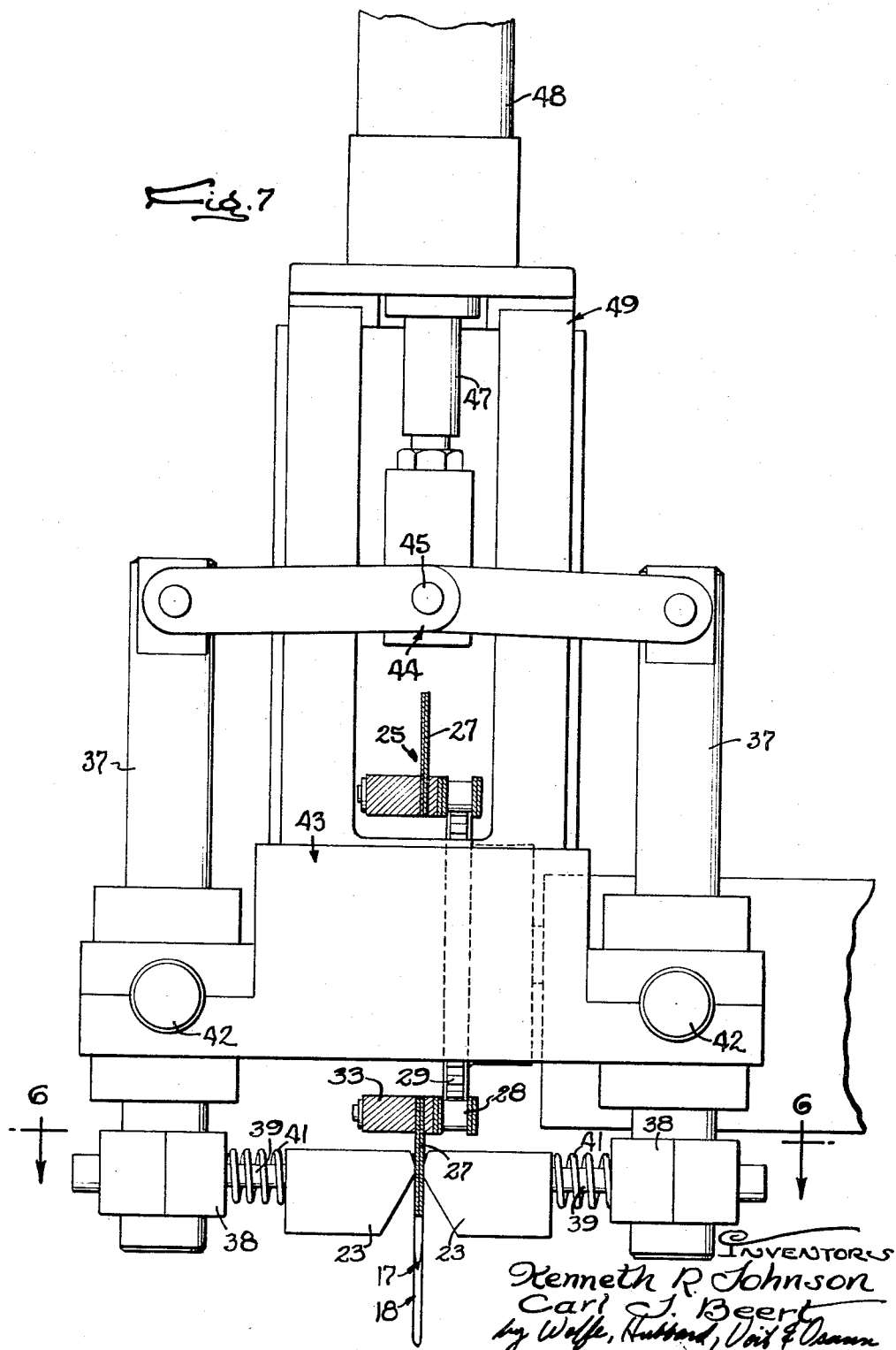

United States Patent Office 3,319,539
Patented May 16, 1967

3,319,539
MACHINE FOR MAKING DOUBLE-WALL
PACKAGES
Kenneth R. Johnson and Carl J. Beert, Rockford, Ill., assignors to Bartelt Engineering Company, Inc., Rockford, Ill., a corporation of Delaware
Filed Jan. 25, 1965, Ser. No. 427,709
7 Claims. (Cl. 93—20)

This invention relates to a machine for making packages and, more particularly, to a machine for making double-wall packages or pouches comprising an inner liner disposed between two outer cover sheets, the liner and the cover being sealed together around the margins of the pouch.

In the manufacture of such packages, two elongated strips of heat-sealable thermoplastic liner material are disposed in side-by-side relation between two strips of cover material, and the strips are advanced in this condition along a path through successive operating stations where the strips are converted into separate pouches having open ends for receiving this product to be packaged.

The primary object of the present invention is to seal a portion of each inner strip to the adjacent outer strip in a novel manner and at high speed as the strips advance through the machine to attach the liner securely to the cover while maintaining the separation of the liner strips at one edge of the strips for eventual formation of the open ends of the pouches.

A more specific object is to form longitudinal heat seals between the edge portions of the liner strips and the adjacent cover strips while the strips are being drawn continuously through the machine and, at the same time, prevent contact between the side-by-side liner strips and support the latter against stretching while they are in the softened condition.

Other objects and advantages of the invention will become apparent from the following detailed description taken in connection with the accompanying drawings, in which FIGURE 1 is a perspective view of a pouch of one type made with a machine embodying the novel features of the present invention.

FIG. 2 is a cross-sectional view taken along the line 2—2 of FIG. 1.

FIG. 3 is a fragmentary perspective view showing the general relationship of the strips as they are drawn through the machine.

FIG. 4 is an enlarged fragmentary cross-sectional view taken in a vertical transverse plane through the strips at the sealing station, the view being taken substantially along the line 4—4 of FIG. 5.

FIG. 5 is a fragmentary perspective view of the machine elements for feeding, folding and sealing the strips.

FIG. 6 is an enlarged fragmentary cross-section taken in a horizontal plane substantially along the line 6—6 of FIG. 7 and showing the support for the seal bars.

FIG. 7 is a fragmentary cross-sectional view taken substantially along the line 7—7 of FIG. 6.

As shown in the drawings for purposes of illustration, the invention is embodied in a machine for forming rectangular double-wall pouches 10 comprising two inner lining sheets 11 composed of heat-sealable thermoplastic material such as polyethylene disposed between two outer cover sheets or panels 12 and sealed together and to the cover panels along the margins of the panels to enclose a quantity 13 of a product in the pouch, the bottom edges of liner sheets and the cover sheets being joined together as by folds 14 and 15. Such pouches are particularly well suited for liquid products as shown herein and for powdered products because the polyethylene sheets form an impervious liner protected by the outer cover which usually is composed of paper of heavier weight than the liner. Although the lower edges of the two cover panels are shown as being joined together by the fold 15, it will be evident that these edges may be separated to form two flaps extending beyond the lower end of the liner.

To form such pouches at high speed, webs 17 and 18 (FIG. 5) of liner and cover material are drawn off supply rolls (not shown) at one end of the machine and guided through a folding device including two vertically spaced triangular folding plows 19, 20 and a pair of rollers (not shown) at the points of the plows for drawing the opposite side edge portions of the webs upwardly around the edges of the plows as they move toward and past the point. Beyond the plows, the four side-by-side strips 17a, 18a formed by the folded side edge portions of the webs 17, 18 are disposed on opposite sides of a vertical central plane and are engaged by two feed rolls 21 which are power-rotated by the main cycle shaft (not shown) of the machine to draw the material off the supply rolls, through the folding device, and through a preliminary heat-sealing station between the folding device and the feed rolls. At this station, a tack seal is formed at 22 (FIGS. 4 and 5) between the upper end portion of each liner strip 17a and the adjacent cover strip 18a to attach the liner securely to the cover. After the tack seals are formed, the two webs are handled as one.

As the webs 17, 18 continue along their path through the machine, they pass through successive operating stations (not shown) where spaced transverse seals are formed to produce a series of integrally connected pockets in the webs, and the webs are severed along these seals to form separate open-ended pouches. Then the side walls of each pouch are separated to permit filling through the open ends, the pouches are filled, and the open ends are sealed closed to complete the operation.

In accordance with the present invention, the tack seals 22 between the cover strips 18a and the liner strips 17a are formed by two stationary sealing bars 23 mounted on the machine on opposite sides of the strips and having opposed heated sealing faces 24 positioned for sliding engagement with the opposite sides of the cover strips as the latter move continuously through the sealing station, and a backing member 25 is provided to move in between the liner strips in advance of the sealing station and then move with the strips through the station. In this manner, the backing member not only holds the two liner strips apart and against the cover strips as the seals 22 are formed and until they have cooled, thereby preventing sealing of the liner strips to each other, but also supports the softened portions of the strips until they have cooled sufficiently to regain their tensile strength.

In this instance, the backing member 25 comprises a plurality of edge-to-edge plates or flags 27 mounted on a carrier 28 (FIGS. 5 and 7) in the form of an endless chain disposed above the path of the webs and having a run following the path of the webs through the sealing station. As shown in FIG. 5, the chain is trained around two sprocket wheels 29 and 30 supported in a common vertical plane on two horizontal shafts 31 and 32 spaced apart longitudinally of the webs with the lower run of the chain closely adjacent the level of the upper edges of the webs and offset slightly to the right (FIG. 7) from the latter.

Each flag 27 is composed of or coated with a material to which the thermoplastic liner material will not adhere to an extent sufficient to cause difficulty in withdrawing the backing from between the strips 17a after the tack seals have cooled. Herein, the flags are formed by two side-by-side plates clamped together and coated on their exposed sides with Teflon. One edge portion of each flag is clamped on a link of the chain 28 by a block 33 and projects downwardly when on the lower run of the chain, the adjacent edges of successive flags on the run being closely spaced to form a substantially continuous backing lying between the liner strips.

To drive the chain 28 and advance the backing 25 at the speed of the strips 17ª, the shaft 31 is rotated in the direction indicated by the arrow in FIG. 5 by a shaft 34 geared at 35 to the sprocket shaft and adapted to be continuously rotated by the cycle shaft of the machine. The left-hand sprocket wheel 29 is positioned above the folding device and the right-hand sprocket wheel 30 is positioned well beyond the sealing bars.

The sealing bars 23 are supported on the machine at the sealing station by means of two upright rocker arms 37 with mounting bars 38 clamped on their lower ends and equally spaced from the opposite sides of the folded webs. Two parallel rods 39 project toward the webs from each mounting block and are slidably received in two bores 40 (FIG. 5) opening through the outer side of the associated seal bar. Coiled springs 41 telescoped over the rods 39 and compressed between the blocks 38 and the seal bars 23 urge the latter along the rods toward each other and press the sealing faces 24 against the adjacent cover strip.

Herein, the sealing faces 24 are two narrow side surfaces disposed in vertical planes in the operative position of the bars 23 and extending longitudinally of the webs 17, 18 very close to the edges thereof. Normally, the blocks 38 are positioned as shown in FIGS. 6 and 7 to hold the sealing faces against the sides of the cover strips 18ª and press both pairs of strips against the backing 25 with a relatively light sealing pressure. The preferred temperature of the faces is approximately 400° F.

As shown in FIG. 7, the rocker arms 37 are pivoted intermediate their ends on horizontal shafts 42 equally spaced from the webs and paralleling the latter, the shafts being supported on a frame member 43 disposed between the two runs of the chain 28 and projecting outwardly on opposite sides thereof. Connected to the upper ends of the rocker arms is a toggle joint 44 pivoted at 45 on the lower end of a piston rod 47 movable endwise up and down by a pneumatic cylinder 48 mounted on a split post 49 extending upwardly from the frame member. When the piston rod is extended as shown in FIG. 7, the knee of the toggle joint is pressed downwardly and the arms 37 are held in vertical positions to press the sealing bars 23 against the strips 18ª. If it is necessary to stop the machine for any purpose, the cylinder 48 is actuated to raise the piston rod, pulling upwardly on the knee of the joint to draw the upper ends of the supporting rods together and thereby spread the seal bars away from the webs. The cylinder preferably is actuated automatically in response to stopping and starting of the machine.

In operation, with the heated sealing bars 23 pressed against the cover strips 18ª and the main cycle shaft turning to operate the various machine elements including the drive rolls 21 and the backing member 25, the webs 17 and 18 are drawn off the supply rolls at a rate determined by the speed of rotation of the drive rolls and are drawn through the folding device toward the preliminary sealing station. At the same time, the flags 27 swing downwardly around the sprocket wheel 29 over the folding device and move in between the liner strips 17ª as the latter are folded toward each other. Before reaching the sealing station, the liner strips and the cover strips are pressed against the opposite sides of the backing by the folding rollers at the points of the plows. Thus, the backing and the four strips move as one into and through the sealing station.

Between the sealing bars 23, the strips 17ª and 18ª are pressed firmly together and against the backing as the seal areas 22 are heated. By the time the strips emerge at the right end of the bars, the liner strips have been heated, through the cover strips, sufficiently to melt the polyethylene which, upon cooling, is bonded to the cover strips along narrow bands closely adjacent the top edges of the strips. Because the rear sprocket wheel 30 is spaced from the sealing bars, the backing flags 27 remain in contact with the liner strips long enough for the seals 22 to cool and the melted polyethylene to regain its tensile strength at the seals. Such cooling preferably is assisted by a continuing flow of air directed across the seal areas by one or more suitably placed nozzles (not shown).

From the foregoing, it will be seen that webs 17, 18 may be drawn very rapidly past the sealing bars 23 to form continuous tack seals 22 between the liner strips 17ª and the cover strips 18ª. The moving backing 25 not only separates the liner strips during the formation of these seals but also supports the linear strips while portions thereof are softened.

We claim as our invention:

1. In a package making machine having operating stations spaced along a horizontal path, the combination of, a device for folding an elongated web of thermoplastic liner material within a web of cover material to form two strips of liner material disposed on opposite sides of a vertical plane and between two strips of cover material with the free edges at the tops of the strips, mechanism for drawing the webs through said device and advancing the folded webs endwise along said path, a pair of sprocket wheels supported on said machine above said path and spaced apart longitudinally of the path on opposite sides of one of said stations, an endless chain trained around said wheels and having a straight run adjacent said free edges, a plurality of edge-to-edge backing plates mounted on said chain in said plane and projecting downwardly from said run between said liner strips to form a substantially continuous backing separating the upper portions of said liner strips, mechanism for rotating said sprocket wheels to move said backing along said path with said strips through said one station, and a pair of opposed sealing bars supported on said machine at said one station and having opposed heated sealing faces positioned on opposite sides of said path for sliding engagement with the upper portions of said cover strips level with portions of said plates and pressing the strips together and against said plates thereby to heat said liner strips through said cover strips and seal each liner strip to the adjacent cover strip.

2. The combination defined in claim 1 in which one of said sprocket wheels is disposed above said folding device to guide said backing plates downwardly and between the strips as the latter are folded.

3. The combination defined in claim 2 in which the other sprocket wheel is spaced beyond the sealing bars far enough to permit cooling of the seals before the plates are withdrawn from between the strips.

4. In a package making machine having operating stations spaced along a horizontal path, the combination of, mechanism for supporting two strips of thermoplastic liner material between two strips of cover material and advancing the strips endwise along said path, a carrier supported on said machine above said path and having a run extending along said path through one of said stations, a plurality of backing plates mounted on said carrier to project downwardly from said run in a common plane and disposed between the upper portions of said liner sheets, mechanism for driving said carrier to advance said plates along said path at the speed of said strips, and a pair of opposed sealing bars supported on said machine at said one station and having opposed heated sealing faces positioned for sliding engagement with said cover strips level with portions of said plates to press the strips together and against said plates thereby to heat said liner strips through said cover strips and seal each liner strip to the adjacent cover strip.

5. The combination defined in claim 4 in which said carrier is an endless chain having a first curved section extending downwardly toward said path in advance of said one station to move said plates in between said liner strips, a horizontal section extending along said path through said one station, and a second curved section extending upwardly away from said path beyond said station thereby to withdraw said plates from between said strips.

6. In a package making machine having operation stations spaced along a predetermined path, the combination of, mechanism for supporting two strips of thermoplastic liner material between two strips of cover material and advancing the strips endwise along said path, an endless backing member having a section disposed between said liner strips and extending along said path through one of said stations, means for advancing said backing member along said path at the speed of said strips, and a pair of stationary sealing bars supported on said machine at said one station and having opposed heated sealing faces positioned for sliding engagement with said cover strips to press the strips together and against said backing member thereby to heat said liner strips through said cover strips and seal each liner strip to the adjacent cover strip.

7. In a package making machine having operating stations spaced along a predetermined path, the combination of, mechanism for supporting a first strip of thermoplastic material and a second strip of cover material in side-by-side relation and advancing said strips endwise along said path, a backing member supported on said machine on one side of said path for engagement with the exposed side of said first strip and for movement along said path with said strips, and a sealing bar stationarily supported on said machine at one of said stations on the side of said path opposite said backing member and having a heated sealing face positioned for sliding engagement with the adjacent side of said second strip to press the strips together and against said backing member thereby to heat said first strip through the second strip and seal the strips together.

References Cited by the Examiner
UNITED STATES PATENTS

| | | | |
|---|---|---|---|
| 1,669,713 | 5/1928 | Kronmiller | 93—20 |
| 2,114,625 | 4/1938 | Bergstein | 93—35 |
| 2,595,421 | 5/1952 | Spalding | 156—583 |
| 2,762,273 | 9/1956 | Harker | 93—20 |
| 2,913,862 | 11/1959 | Sabee | 53—180 X |
| 3,082,585 | 3/1963 | Waters | 53—180 |

FRANK E. DAILEY, *Primary Examiner.*

N. ABRAMS, *Assistant Examiner.*